United States Patent

Kraakman

[15] 3,643,547
[45] Feb. 22, 1972

[54] HYDRAULIC RECIPROCATING ENGINE

[72] Inventor: Hillebrand Johannes Josephus Kraakman, Emmasingel, Eindhoven, Netherlands

[73] Assignee: U.S. Philips Corporation, New York, N.Y.

[22] Filed: Sept. 16, 1969

[21] Appl. No.: 858,445

[30] Foreign Application Priority Data

Sept. 18, 1968 Netherlands..........................6813313

[52] U.S. Cl......................................91/48, 91/165, 91/452
[51] Int. Cl...................................F15b 13/042, F15b 11/08
[58] Field of Search....................91/165, 390, 51, 446, 417, 91/48, 452, 47

[56] References Cited

UNITED STATES PATENTS 3,420,265  1/1969  DePauw..................................91/446
2,980,064  4/1961  Norton et al............................91/165

Primary Examiner—Paul E. Maslousky
Attorney—Frank R. Trifari

[57] ABSTRACT

A hydraulic reciprocating engine having a piston which is movable in a cylinder, at least one piston rod is secured to the piston. On one side of the piston a supply pressure prevails, and on the other side a regulating pressure prevails. A pressure regulating system is connected between the duct in which the supply pressure and the regulating pressure prevails. The value of a regulating pressure is adjustable in accordance with the value of the supply pressure and in accordance with an adjusting element, for example a spring, acting on a regulating valve of the system. The pressure-regulating system has at least one regulating member, in which the ratio of the surfaces of the regulating member has such a value that in the absence of a force exerted by the adjusting element, the regulating pressure adjusted by the pressure regulating valve relative to the supply pressure, has a value which is inversely proportional to the ratio of the value of the piston surfaces of the hydraulic motor.

2 Claims, 1 Drawing Figure

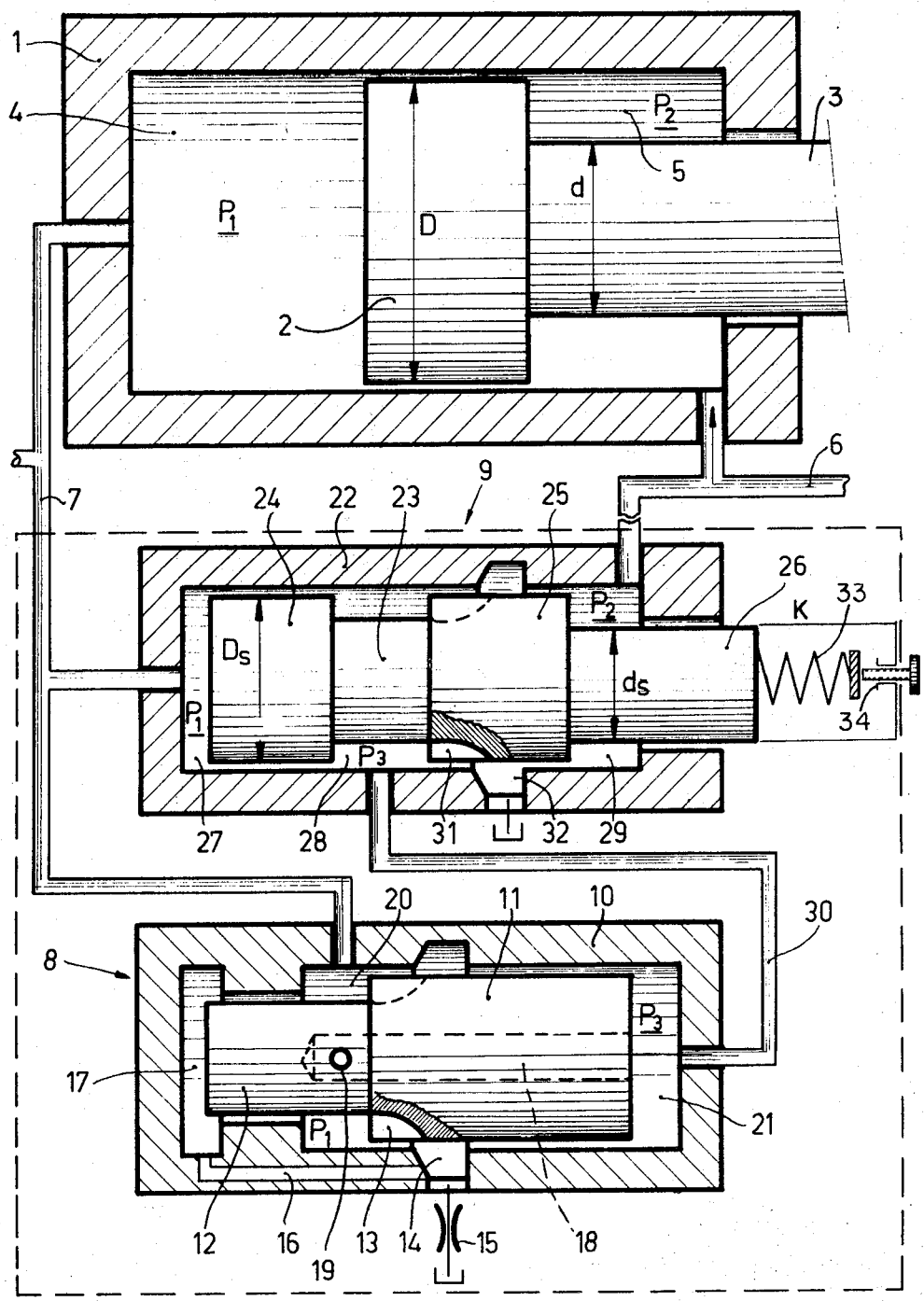

HYDRAULIC RECIPROCATING ENGINE

The invention relates to a hydraulic reciprocating engine comprising having a piston movable in a cylinder. At least one piston rod is secured to the piston and the cylinder is divided by the piston into two spaces, one of which communicates with a duct in which a supply pressure prevails and the other of which communicates with a duct in which an adjustable regulating pressure prevails.

In such hydraulic reciprocating engines it is often desirable that the force which the piston rod exerts on a tool, has a substantially constant value which is independent of the supply pressure of the liquid on the piston and also independent of the rate of movement of the piston. Such situations occur, when the reciprocating engine is used in machine tools, for example, a precision lathe. In this case it is desirable that the force acting on the lathe center have a constant value.

It is the object of the invention to, provide a hydraulic reciprocating engine, in which the value of the force exerted by the piston is adjustable at a substantially constant value independent of the rate of movement of the piston and independent of the supply pressure which acts upon the piston. For that purpose the hydraulic reciprocating engine according to the invention is characterized in that a pressure-regulating system is connected between the ducts in which the supply pressure and the regulating pressure prevails. The valve of the regulating pressure is adjustable in accordance with the value of the supply pressure and in accordance with an adjusting element, for example, a spring, acting on a valve member in the system. The ratio of surfaces of the valve member has a value such that, in the absence of a force exerted by the adjusting element, the regulating pressure adjusted by the pressure-regulating system relative to the supply pressure, has a value which is inversely proportional to the ratio of the value of the piston surfaces of the hydraulic motor.

In order that the invention may be readily carried into effect, one embodiment thereof will now be described in greater detail, by way of example, with reference to the accompanying drawing, the sole FIGURE of which diagrammatically shows a reciprocating engine, to which a pressure regulating system is connected. The pressure-regulating system is shown in the part of the drawing encircled in broken lines.

The hydraulic engine comprises a cylinder 1 in which a piston 2 is axially movable. A piston rod 3 is secured to the piston 2 and projects through a cover of the cylinder 1. In this manner two spaces 4 and 5 are formed in the cylinder. A duct 6 communicates with the space 5, through which duct a liquid, for example, oil, in which the supply pressure $p2$ prevails is supplied to the space 5. The space 4 communicates with a duct 7 with which liquid, for example, oil in which a regulating pressure $p1$ prevails, is supplied to the hydraulic motor.

The pressure-regulating valve system which is shown in the part of the drawing encircled by broken lines, comprises a regulating valve 8 and a control valve 9. The duct 7 in which the pressure $p1$ is adjusted by means of the pressure-regulating system, communicates with regulating valve 8, and duct 6 which contains liquid of a pressure $p2$, communicates with the control valve 9. The overall pressure-regulating system is constructed so that the pressure $p2$ cooperates in regulating the pressure $p1$. In principle, it is of no importance to the essence of the invention how the pressure-regulating valve is constructed. Essential for the invention is that a pressure-regulating system be used which is constructed so that the pressure $p2$ cooperates in regulating the pressure $p1$ and that the liquid in which the pressures $p1$ and $p2$, respectively, prevail, is also operative on the piston surfaces of the hydraulic motor. The valve mechanisms 8 and 9 are shown and described only by way of example of a pressure-regulating system to be used.

The regulating valve 8 comprises a cylinder 10 in which a piston 11 is axially movable. The front of the piston 11 has a part 12 having a smaller diameter than the piston 11. Recesses 13 are provided on the circumference of the piston 11. These recesses open into an annular outlet chamber 14 which communicates with an outlet duct for the liquid. The recesses 13 and the outlet chamber 14 together constitutes outlet ports the size of which depends upon the position of the piston 11 in the cylinder 10. Since, through these outlet ports liquid flows out of the duct 7, the pressure $p1$ is determined by the size of the outlet ports. In the outlet duct of the liquid an adjustable restriction 15 is present. As a result of this restriction, a pressure is generated in the liquid flowing out of the outlet chamber 14. Liquid, in which this pressure prevails, is supplied through a duct 16 to a space 17 where said liquid exerts a force on the front of the part 12 and hence cooperates in the adjustment of the piston 11.

The piston 11 has a bore 18 and the part 12 has an aperture 19 of a small diameter which adjoins the bore 18. Through aperture 19 and bore 18 a small quantity of liquid flows from the space 20 on the front to the space 21 on the rear side of the piston 11. The aperture 19 serves as a resistance to said flowing liquid. A pressure designated $p3$ is generated in the liquid in space 21.

The position of the piston 11 in the cylinder 10 and hence the size of the outlet ports and hence the value of $p1$ in the space 20 is mainly determined by the forces which the pressures $p1$ and $p3$ in the spaces 20 and 21 exert on the piston 11. Since in the recesses 13 liquid flows away at a comparatively high speed, the static pressure of the liquid in the space 20 will not everywhere be equal to $p1$; in the recesses 13 the static pressure, as a result of the flowing liquid, is considerably lower. As a result of this, a deviation from the desirable equilibrium state of the piston 11 in the cylinder 10 might be formed. In order to remove this deviation the space 17 communicates with the outlet chamber 14 through the duct 16. The liquid pressure in the outlet chamber 14 hence exerts a force on the part 12 of the piston 11; this force forms a compensation for the deviation of the static pressure in the recesses 13. So by means of the regulating valve 8 a desirable pressure $p1$ is accurately adjusted.

The value of the pressure $p3$, hereinafter referred to as the control pressure, which in the space 21 acts upon the piston 11 of the regulating valve 8 is adjusted by means of the control valve 9. The control valve 9 comprises a cylinder 22 in which a valve member is axially movable. The valve valve member comprises a body 23, a piston 24, a piston 25 and a cylindrical part 26. The liquid of pressure $p1$ communicates with space 27, the liquid from the space 21 of regulating valve 8 communicates through a duct 30 with space 28 and the supply pressure $p2$ communicates with space 29. The diameters of the pistons 24 and 25 are the same. The diameter of the cylindrical part 26 is smaller than the diameter of the piston 25, so that the space 29 is formed. The piston 25 has recesses 31 which open into an annular outlet space 32, which space 32 communicates with a duct for conducting away liquid. The recesses 31 and the outlet space 32 constitute outlet ports, the value of the pressure $p3$ depends upon the size of said outlet ports, which in turn again depend upon the position of the valve member 23, 24, 25 in the cylinder 22. An external force moreover acts upon the cylindrical part 26 of the valve member. This force is usually produced by a spring which is denoted by 33 in the drawing. This external force is adjustable by adjusting means referred to generally as numeral 34.

As already noted, the value of the pressure $p3$ is regulated by the control valve 9. A force caused by the liquid pressure $p1$, which in the space 27 acts upon the piston 24, acts on the valve member in one direction. The liquid pressure $p2$ acts in the other direction and is exerted on the differential area surface of the piston 25 and the part 26, i.e., $\pi/4(D_x^2 - d_x^2)$. The spring 33 may also exert a force on the valve member through part 26. The valve member is axially adjusted in such a position that the forces on the valve member 23, 24, 25 are in equilibrium. With this position, a particular size of the outlet ports 31, 32 is obtained and hence also a particular value of the control pressure $p3$. The value of the liquid pressure $p1$ is adjusted in the regulating valve 8 dependent upon the value of the control pressure $p3$.

The pressure-regulating system described produces an extremely accurate adjustment of the pressure $p1$ in accordance with the value of the supply pressure $p2$ and the force caused by the spring 33. However, it is pointed out again that the pressure-regulating system described is not essential for the invention; the conditions which the pressure-regulating system must satisfy are clearly indicated above.

In order to cause the piston rod 3 to exert a desirable constant force which is independent of the value of the supply pressure, for example, on the center of a lathe, the hydraulic motor and the pressure-relating valve must be adapted to each other correctly. This will be explained below. The value of the external force caused, for example, by the spring 33, is preliminarily assumed to be zero. In that case, for piston 2 to be in a stage of equilibrium $$p1(\pi/4)D^2 = p2(\pi/4)(D^2-d^2);$$

wherein $D$ is the diameter of the piston 2, and $d$ the diameter of the piston rod. The external force on the part of the piston rod 3 not shown then is equal to zero. The pressure-regulating system must now operate to regulate the pressure $p1$ relative to $p2$ in such manner that the above condition is satisfied. The ratio of the pressure $p1$ and $p2$ in the pressure-regulating valve as shown in the drawing, follows from the equilibrium of forces in the control valve 9 (the force of the spring 33 still being assumed to be equal to zero). For equilibrium of the valve member in the control valve 9, it holds that:

$p1(\pi/4)D_s^2 = p2(\pi/4)(D_s^2-d_s^2)$, wherein $D_s$ is the diameter of the pistons 24 and 25 and $d_s$ is the diameter of the part 26.

From the equilibrium comparisons of the hydraulic motor and the control valve the condition follows which must be satisfied so as to obtain no external force on the piston rod 3 in the case of the force of the spring 33 being equal to zero.

It can simply be seen that this condition is:

$$D^2/D_s^2 = (D^2-d^2)/(D_s^2-d_s^2)$$

This means for the hydraulic motor with a pressure-regulating system shown in the drawing that obtaining an external force of zero on the hydraulic motor only depends upon ratios of the surfaces on which the pressures $p1$ and $p2$, in the hydraulic motor and in the control valve, act. This ratio is again equal to the diameter ratio given above. So, the value of the control pressure $p3$ is of no influence.

If P1 were to increase, the additional force in space 27 of control valve 9, would move valve member 23, 24, 25 to the right. Outlet port 31, 32 would hence increase and control pressure P3 would therefore decrease. When P3 decreases, the force acting on the right-hand end of piston 11 in regulating valve 8 would also decrease and piston 11 would therefore no longer be in a state of equilibrium and piston 11 with part 12 would move to the right. When piston 11 moves to the right, outlet port 13, 14 also becomes larger allowing more liquid to flow therethrough out of the system resulting in regulating pressure P1 decreasing until valve member 23, 24, 25 is again in a stage of equilibrium. When the valve member is in equilibrium, the forces on piston 2 will again be equal.

If, on the other hand it is desired to adjust the position of piston 2, for example, to move it to the right, means 34 will be adjusted so that spring 33 exerts a force K on the valve member 23,24,25 of the control valve. The valve member will thus be caused to move to the left thereby decreasing the opening of outlet port 31, 32. Control pressure P3 will consequently increase causing piston 11 to move to the left thus decreasing the opening of outlet port 13, 14. As a result pressure P1 will increase. The increase in the regulating pressure $\Delta p1$ is a result of the additional force K, thus:

$$\Delta p1(\pi/4)D_s^2 = K.$$

The pressure $\Delta p1$ hence exerts a force on the piston 24 which is equal to: $\Delta p1 = K/[(\pi/4)D_s^2]$. This $\Delta p1$ also exerts a force on the piston 2 which is equal to $\Delta p1(\pi/4)D^2$. After substitution of the indicated value of $\Delta p1$, it follows herefrom that as a result of the force K of the spring 33 on the hydraulic motor a force is exerted having a value $K(D^2/D_s^2)$, which force is independent of the supply pressure $p2$, of the rate of movement of the piston 2, and can be constant if K is maintained constant. This same force which $\Delta p1$ exerts on the piston of a hydraulic motor is exerted by the piston rod of said motor on, for example, the center of a lathe. This external force of the piston rod 3 hence is larger by a ratio $D^2/D_s^2$ than the force K of the spring 33 which causes the force on the piston rod 3. The hydraulic motor with the regulating valve hence also form a force intensifier.

In the example described, a pressure-regulating system is used having a control valve 9 in which the force $p1$ to be regulated on the control valve has influence on the equilibrium of forces. This is not essential for the essence the invention. Any pressure control valve in which the supply pressure $p2$ and an external force, for example, a spring, adjust the pressure $p1$ of the regulating valve 8 on the piston 2 of the hydraulic motor may be used. From the above it will be obvious that the ratio of the piston surfaces on which in the motor, the pressures $p1$ and $p2$ act must be equal to the ratio of surfaces which in the pressure-regulating system cooperate in obtaining the desirable ratio between the pressures $p1$ and $p2$ in the pressure-regulating valve.

What is claimed is:

1. A hydraulic reciprocating engine comprising a cylinder, a piston having a first end face and a second end face axially movable within said cylinder, at least one piston rod attached to one of the end faces of said piston and extending beyond the confines of said cylinder so as to be available for exerting an external force, said piston dividing the cylinder into first and second end spaces respectively, a first duct communicating with said first end space in which an adjustable regulating pressure prevails for acting on said first end face of the piston, a second duct communicating with said second end space in which a supply pressure prevails for acting on the second end face of said piston, a pressure-regulating system connected between said first and second ducts for adjusting the value of said regulating pressure, said pressure-regulating system comprising an adjustable valve member and an adjusting element arranged for exerting a force on said valve member, the ratio of opposed surface areas of said valve member having a value such that in the absence of a force exerted by said adjusting element said regulating pressure has a value which is inversely proportional to the ratio of the surface area of said first and second piston end faces, whereby said regulating pressure will be adjusted by said pressure-regulating valve in accordance with the value of said supply pressure and said adjusting element.

2. The hydraulic reciprocating engine according to claim 1 wherein said adjusting element is a spring.

* * * * *